US012312261B2

(12) United States Patent
Mason (10) Patent No.: US 12,312,261 B2
(45) Date of Patent: May 27, 2025

(54) MAGNETIC WATER FILTER ASSEMBLY (71) Applicant: NIBCO Inc., Elkhart, IN (US)

(72) Inventor: Christopher W. Mason, Granger, IN (US)

(73) Assignee: NIBCO Inc., Elkhart, IN (US)

(*) Notice: Subject to any disclaimer, the term of this patent is extended or adjusted under 35 U.S.C. 154(b) by 246 days.

(21) Appl. No.: 17/739,275

(22) Filed: May 9, 2022

(65) Prior Publication Data
US 2022/0363574 A1 Nov. 17, 2022

Related U.S. Application Data (60) Provisional application No. 63/186,898, filed on May 11, 2021.

(51) Int. Cl.
C02F 1/48 (2023.01)
B01D 29/11 (2006.01)
B01D 35/06 (2006.01)
B03C 1/28 (2006.01)
B03C 1/30 (2006.01)
C02F 1/00 (2023.01)
F24D 19/00 (2006.01)
C02F 101/20 (2006.01)

(52) U.S. Cl.
CPC ............ C02F 1/488 (2013.01); B01D 29/117 (2013.01); B01D 35/06 (2013.01); B03C 1/286 (2013.01); B03C 1/30 (2013.01); C02F 1/001 (2013.01); F24D 19/0092 (2013.01); C02F 2101/20 (2013.01)

(58) Field of Classification Search
CPC ........ C02F 1/488; C02F 1/001; B01D 29/117; B01D 35/06; B03C 1/286; B03C 1/30; F24D 19/0092
See application file for complete search history.

(56) References Cited

U.S. PATENT DOCUMENTS 2,926,787 A * 3/1960 Combest ................ B01D 35/06
210/434
3,591,002 A * 7/1971 Rosaen ................ B01D 35/143
210/90

(Continued)

FOREIGN PATENT DOCUMENTS

CN 207002504 2/2018
EP 2614893 7/2013

(Continued)

OTHER PUBLICATIONS

Ensinger glass-filled PA66 https://www.ensingerplastics.com/en-us/shapes/products/glass-filled-pa66-tecamid-66-gf30-natural (Year: 2020).*

(Continued)

Primary Examiner — Liam Royce
(74) Attorney, Agent, or Firm — PRICE HENEVELD LLP (57) ABSTRACT A magnetic water filter assembly with a removable lighter weight lower section to permit access to the internal components of the filter assembly. The removable lower section allows the servicing and/or replacement of the internal filter as well as cleaning of the assembly. The lighter weight lower section reduces the stress placed on the surrounding plumbing components, including the piping/tubing that couples to the filter assembly.

20 Claims, 6 Drawing Sheets (56) References Cited

U.S. PATENT DOCUMENTS

| | | | | | |
|---|---|---|---|---|---|
| 4,495,068 | A | * | 1/1985 | Rosaen | B01D 35/143 |
| | | | | | 210/136 |
| 5,908,020 | A | * | 6/1999 | Boutwell | F02M 31/20 |
| | | | | | 123/41.31 |
| 9,669,414 | B2 | | 6/2017 | McAllorum et al. | |
| 9,873,130 | B2 | | 1/2018 | Adey et al. | |
| 10,946,391 | B2 | | 3/2021 | Adey et al. | |
| 11,260,326 | B2 | * | 3/2022 | Downie | F24D 19/0092 |

FOREIGN PATENT DOCUMENTS

| | | |
|---|---|---|
| EP | 3760314 | 1/2021 |
| GB | 2491361 | 12/2012 |
| GB | 2509714 | 7/2014 |
| WO | 2018207083 | 11/2018 |
| WO | 2020128954 | 6/2020 |

OTHER PUBLICATIONS

The Spear and Jackson Group, "Boilermag Magnetic Water Filter System" (Jan. 8, 2013).

* cited by examiner

MAGNETIC WATER FILTER ASSEMBLY

CROSS REFERENCE TO RELATED APPLICATION

Applicant hereby claims the priority benefits under the provisions of 35 U.S.C. § 119, basing said claim of priority on related U.S. Provisional Application No. 63/186,898 filed May 11, 2021, which is incorporated in its entirety herein by reference.

FIELD OF THE INVENTION

The present invention relates to a serviceable filter which removes ferrous and non-ferrous debris from a boiler system.

BACKGROUND OF THE INVENTION

A boiler filter can be used to remove ferrous and non-ferrous debris from a plumbing system that is connected to a boiler. For example, a magnetic water filter can be installed on or near a boiler inlet or system return line. The magnetic water filter can then remove particles before they enter into the boiler. The magnetic water filter typically utilizes a magnet that will collect ferrous debris, and one or more filters that will screen non-ferrous debris. The magnetic water filter can include a drain valve to remove/flush out the non-ferrous debris. The removal of the non-ferrous debris relies upon gravity positioning the debris at or near the drain valve and the drain valve remaining operable and not obstructed or otherwise inoperable. In addition, the internal filter typically can not be accessed for service and/or replacement.

A magnetic water filter assembly that combines ferrous and non-ferrous debris filtration into one serviceable device and specifically suited for larger diameter hydronic heating systems would be advantageous.

SUMMARY OF THE INVENTION

One object of the present invention is a magnetic water filter assembly. The magnetic water filter assembly includes a housing having an upper section and a lower section. The upper section has a first port and an oppositely disposed second port with a flow diversion member positioned adjacent to the second port. The upper section includes a magnet opening that is positioned on the top surface of the upper section in between the first port and the second port. The magnet opening is generally perpendicular to the centerline of the first port and the second port. The lower section has an open cavity, is removably coupled to the upper section, and has a drain port. A screen member is positioned in the open cavity of the lower section, and includes a cavity section that is in fluid communication with the first port. A magnet member coupled to the magnet opening and extends into the cavity section of the screen member. Water enters the first port flowing past the magnet member, through the screen member, past a gap between the flow diversion member and the second port, and then out the second port. A drain valve member is coupled to the drain port.

Another aspect of the present invention is a plumbing system with a magnetic water filter assembly. The plumbing system has a housing having an upper section and a lower section. The upper section has a first port and an oppositely disposed second port with a flow diversion member positioned adjacent to the second port. The upper section includes a magnet opening that is positioned on the top surface of the upper section in between the first port and the second port. The magnet opening is generally perpendicular to the centerline of the first port and the second port. The lower section has an open cavity, a drain port, and is removably coupled to the upper section. A screen member is positioned in the open cavity of the lower section. The screen member includes a cavity section that is in fluid communication with the first port. A magnet member is coupled to said magnet opening and extends into the cavity section of the screen member. Water entering the first port flows past the magnet member, through the screen member, past a gap between the flow diversion member and the second port, and then out the second port. A drain valve member is coupled to the drain port. An incoming water supply pipe is coupled to the first port and an outgoing water supply pipe is coupled to the second port.

Yet another aspect of the present invention is a plumbing system for a boiler. The plumbing system includes a housing having an upper section and a lower section. The upper section has a first port and an oppositely disposed second port with a flow diversion member positioned adjacent to the second port. The upper section includes a magnet opening that is positioned on the top surface of the upper section in between the first port and the second port. The magnet opening is generally perpendicular to the centerline of the first port and the second port. The lower section has an open cavity, is removably coupled to the upper section, and has a drain port. A screen member positioned in the open cavity of the lower section. The screen member includes a cavity section that is in fluid communication with the first port. A magnet member coupled to the magnet opening. The magnet member extends into the cavity section of the screen member. Water entering the first port flows past the magnet member, through the screen member, past a gap between the flow diversion member and the second port, and then out the second port. A drain valve member is coupled to the drain port. An incoming water supply is coupled to the first port, and an outgoing water supply is coupled between the second port and a boiler.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

Figure 1:
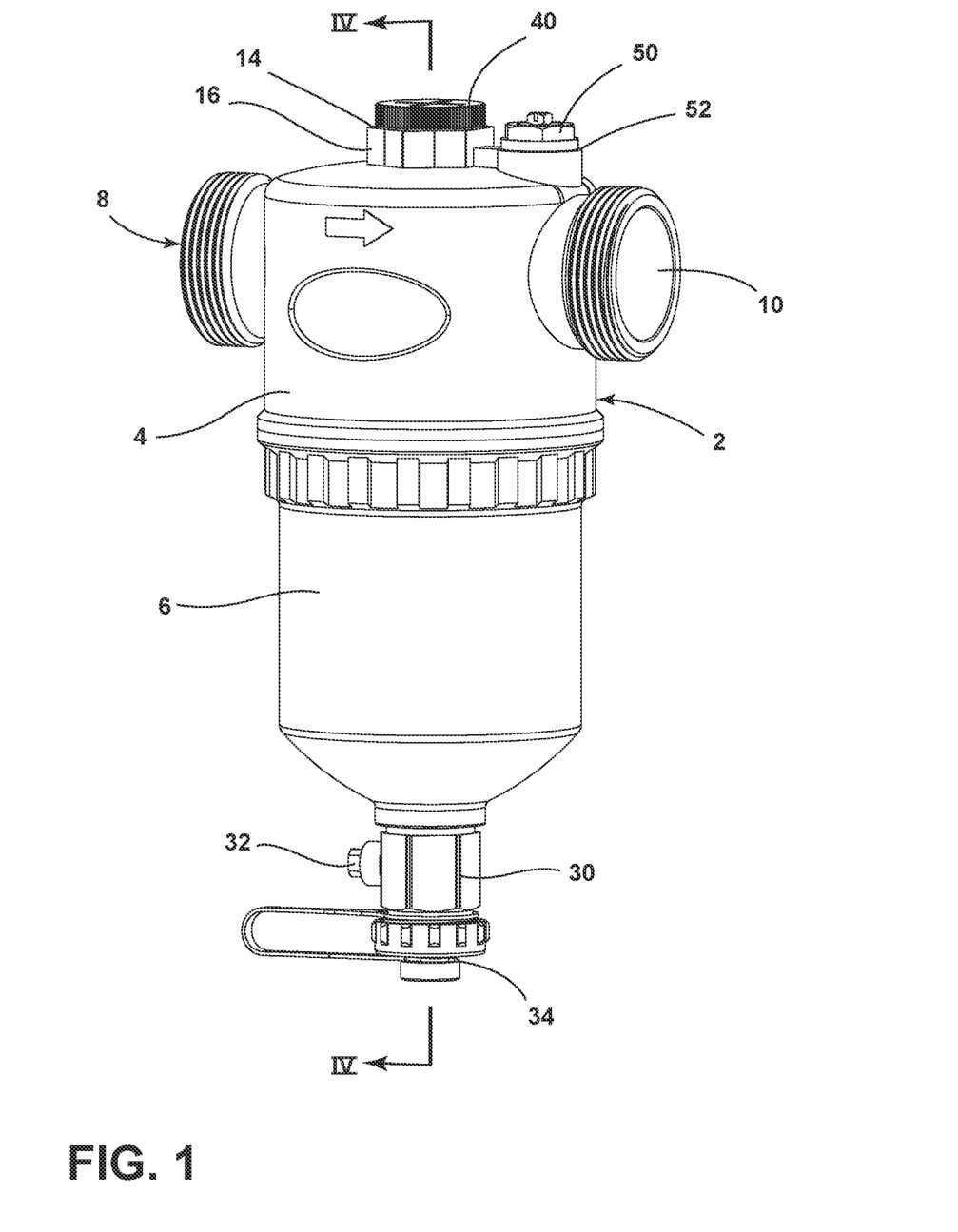
FIG. 1 is a font perspective view of a magnetic boiler filter assembly embodying one aspect of the present invention.
Figure 2:
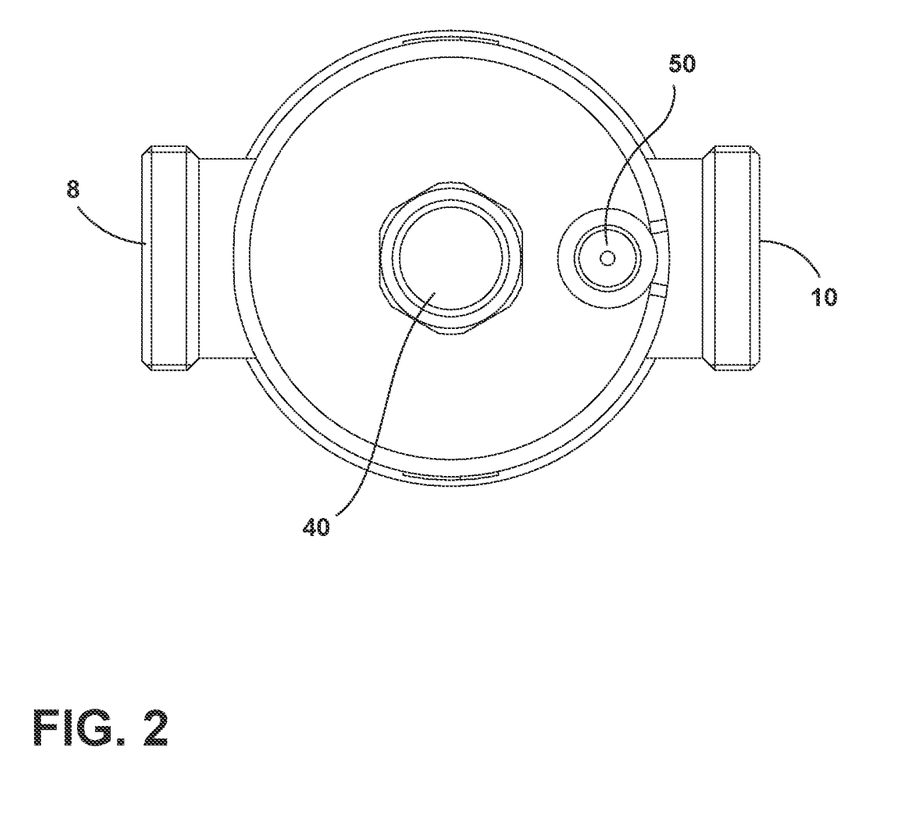
FIG. 2 is a top elevational view of the magnetic boiler filter assembly shown in FIG. 1.
Figure 3:
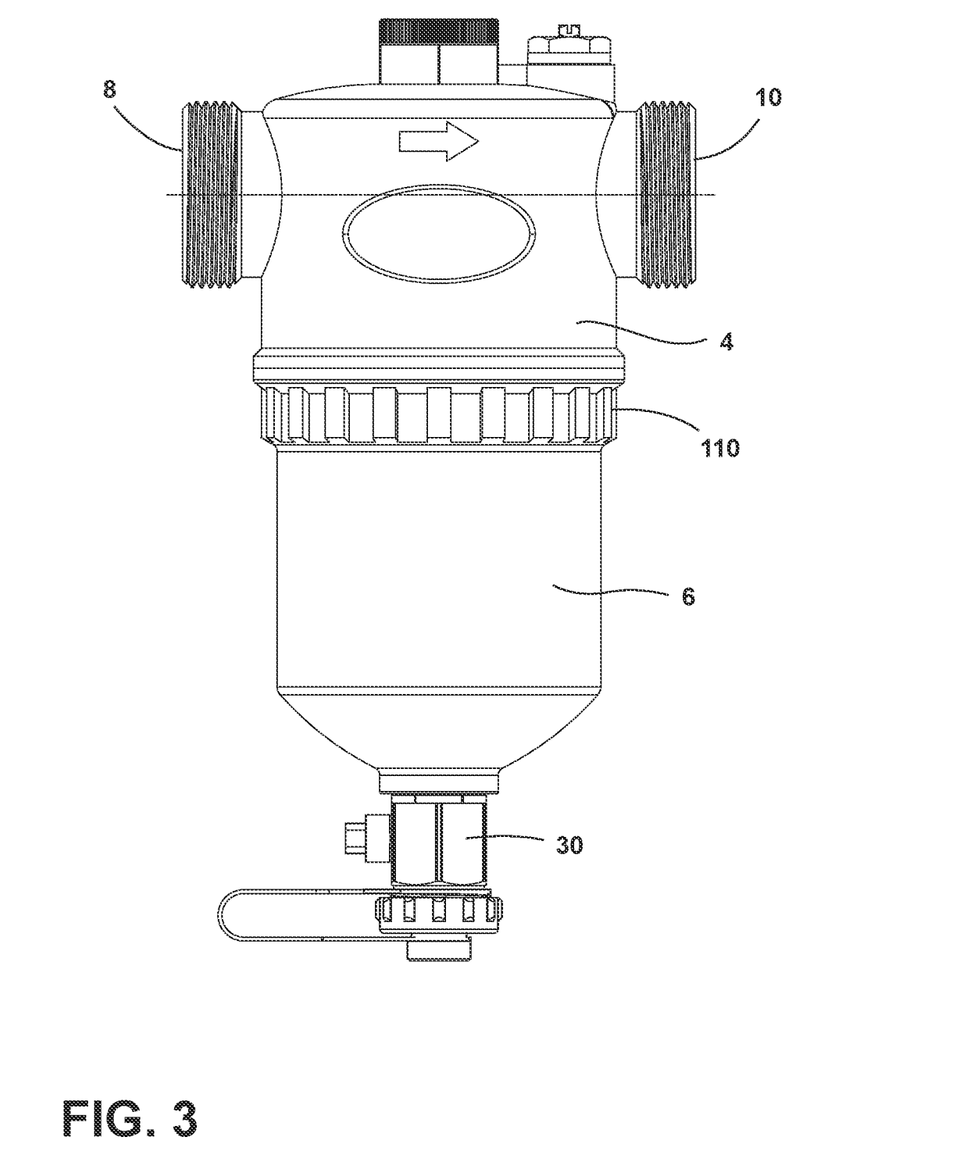
FIG. 3 is a front elevational view of the magnetic boiler assembly shown in FIG. 1.

A magnetic water filter assembly 2 is shown in FIG. 1. The magnetic water filter assembly 2 can be used to filter ferrous and nonferrous material out of a plumbing system before the fluid enters a boiler. The magnetic water filter assembly 2 an upper section 4 and a lower section 6. The upper section 4 includes a first port 8 and an oppositely disposed second port 10. The first port 8 is connected to the incoming water supply. The second port 10 is connected to the outgoing water supply that connects to other plumbing components, including, but not limited to, a boiler. In the illustrated embodiment, the first port 8 is disposed opposite the second port 10. The upper section 4 can be made from a metal material, including, but not limited to, brass. The lower section 6 is removably coupled to the upper section 4. The lower section 6 can be made from a lighter weight material, such as a polymeric material. In the illustrated embodiment, the lower section 6 is made from a glass-filled engineered polymer, such as a PA66 glass-filled engineered polymer. The metal upper section 4 permits the metal-to-metal piping connection if the incoming and/or outgoing water supply is a metal pipe. In addition, the lower section 6, being made of a lighter weight material, allows the reduction in weight of the overall magnetic water filter assembly 2.

The upper section 4 includes a magnet member opening 14. In the illustrated embodiment, the magnet member opening 14 is in a raised boss 16 positioned on the top surface of the upper section 4. The upper section 4 also includes a vent valve 50 that is positioned adjacent to the second port 10. The vent valve 50 is coupled to a vent valve opening 52 in the top surface of the upper section 4. An O-ring 53 can be used to help seal the coupling of the vent valve 50 to the vent valve opening 52. A flow diversion member 12 is positioned in the upper section 4 adjacent to the second port 10. The flow diversion member 12 prevents the fluid entering in from the first port 8 from exiting the second port 10 without passing through the filter components described below.

Figure 4:
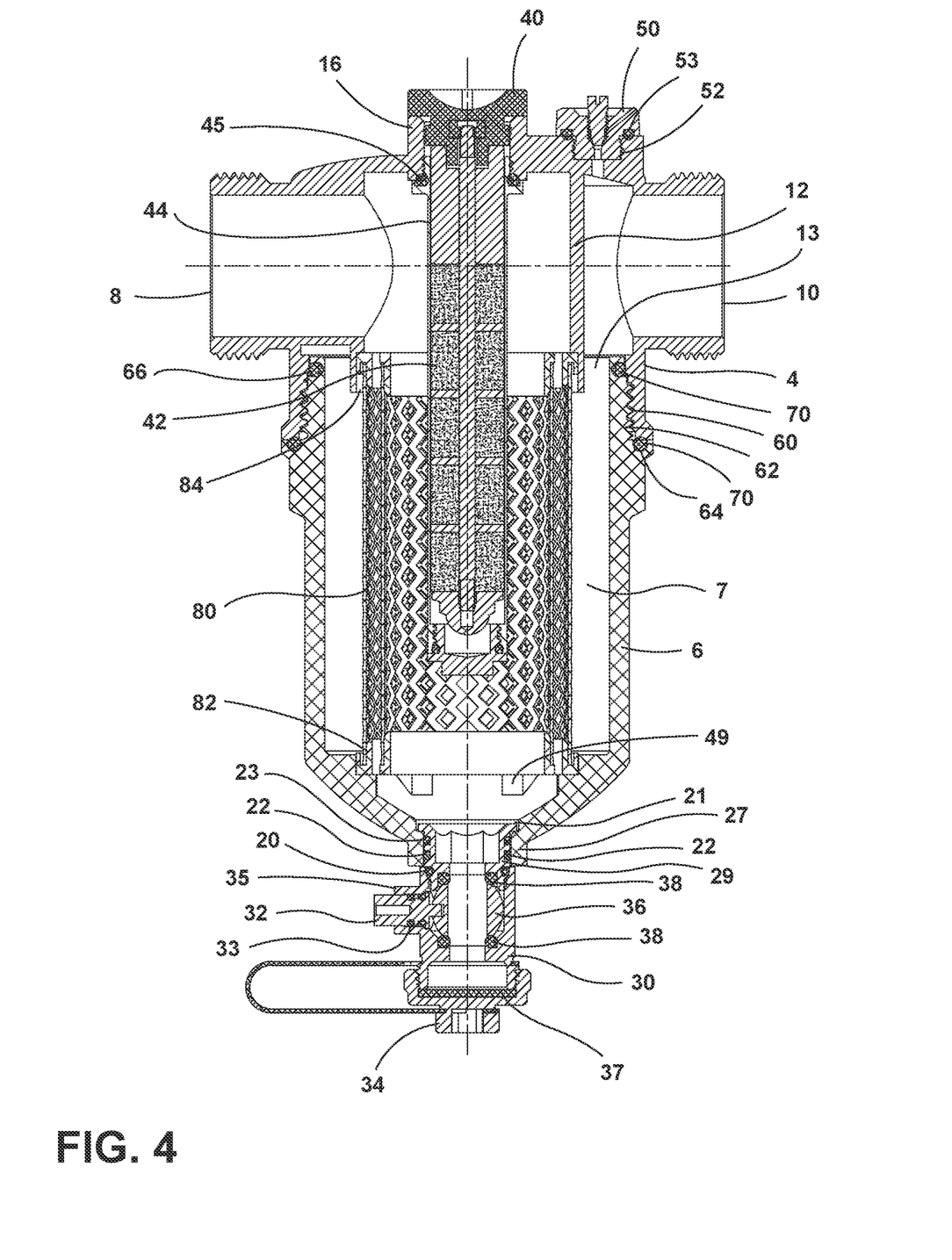
FIG. 4 is a cross-sectional view of the magnetic boiler filter assembly of FIG. 1 taken along line IV-IV.

The lower section 6 includes an open cavity area. The lower section 6 also includes a drain port 27. In the illustrated embodiment, a drain extension 29 is coupled to the drain port 27. The drain extension 29 can include an internal shoulder 21 that abuts a surface of the lower section 6. O-rings 22 can be positioned within O-ring grooves 23 in the drain extension 29 to seal the drain extension 29 to the drain port 27. A drain valve member 30 is coupled to the drain extension 29. The drain valve 30 includes a stem 32 that is positioned within a stem opening 35 in the drain valve member 30. Drain valve member 30 also includes a ball 36 which can be rotated by actuation of the stem 32. Stem seals 33, such as O-rings, are positioned in between the stem 32 and the stem opening 35 of the drain valve member 30. Seals 38 can be positioned around the ball 36 of the drain valve member 30. The drain valve member 30 can also include a gasket 37 and a cap 34, as illustrated in FIG. 4.

Figure 6:
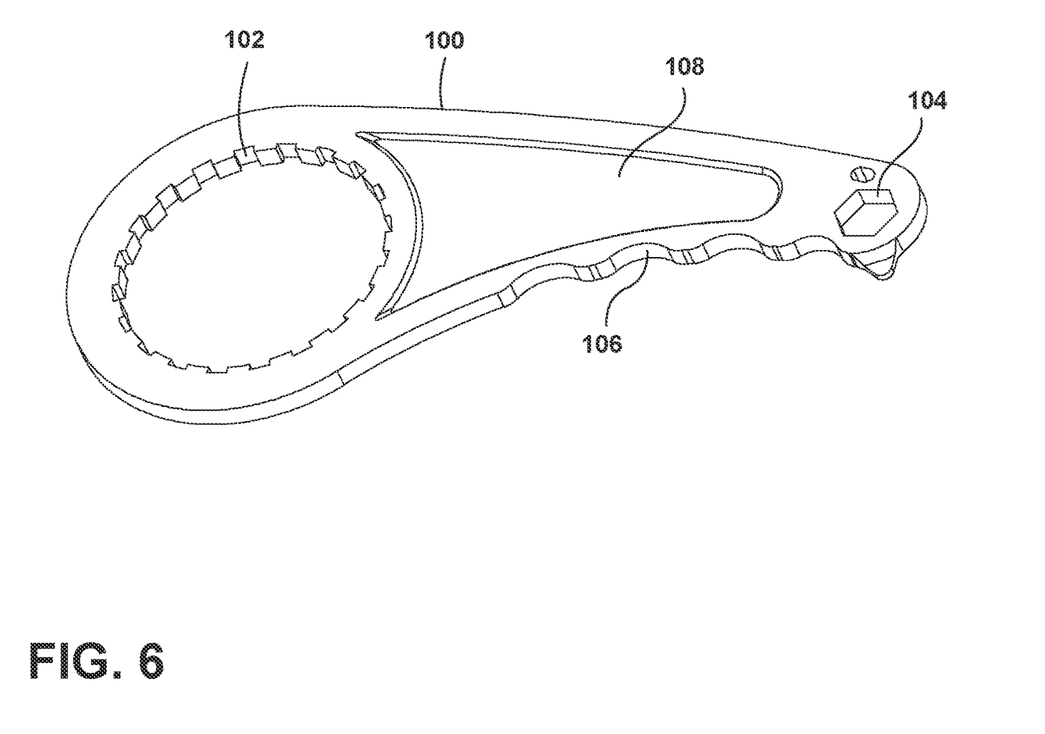
FIG. 6 is top perspective view of the tool for use with the magnetic boiler filter assembly shown in FIG. 1.

The exterior surface of the stem 32 can be configured for rotation by tool 100, as shown in FIG. 6. Specifically, section 104 of the tool 100 can be placed around exterior surface 110 of the stem 32 to open and close the drain valve member 30.

The lower section 6 is removably coupled to the upper section 4. In the illustrated embodiment, the threaded surface 62 of the lower section 6 couples with the threaded surface 60 of the upper section 4. O-ring grooves 64 and 66 are formed in the lower section 6 above and below the threaded surface 62. O-rings 70 can be positioned in the O-ring grooves 64, 66 to help seal the connection between the lower section 6 and the upper section 4.

A filter 80 is positioned within the cavity section 7 of the lower section 6. The filter 80 is positioned and centered on surfaces of the lower section 6 and/or upper section 4. For example, lower section 82 can abut a shoulder that is formed within the lower section 6 and the upper section 84 can abut the upper section 4, as shown in FIG. 4. A setting ring 49 can be positioned below the filter 80. The filter 80 is designed to filter sediment out of the incoming fluid supply. The screen size and material used in the screen can be altered, depending upon the desired filtration parameters. For example, the size of the openings can be altered to filter certain size particles out of the fluid stream. In addition, the materials used within the filter can include polymeric metal or other materials that can filter the fluid. A magnet member 40 is coupled to the magnet opening 14 and raised boss 16, as shown in FIG. 4. The magnet member 40 can include a magnet cover 44 that surrounds a portion of the magnet member 40 that contacts fluid within the magnetic water filter assembly 2. The magnet member 40 can include one or more magnets 42 that are positioned within the magnet member 40. The magnet member 40 extends into the internal cavity of the filter 80, as shown in FIG. 4. In the illustrated embodiment, the magnet member 40 is a 12,000 gauss magnet. The magnet member 40 will attract and hold ferrous particles that enter the magnetic water filter assembly 2. The magnet member 40 can be removed from the magnetic water filter assembly 2 to permit the cleaning of the magnet member 40 and/or replacement of the magnet member 40. A portion of tool 100 can be used to remove the magnet member 40 from the magnet opening 14 in the upper section 4 of the magnetic water filter assembly 2.

Figure 5:
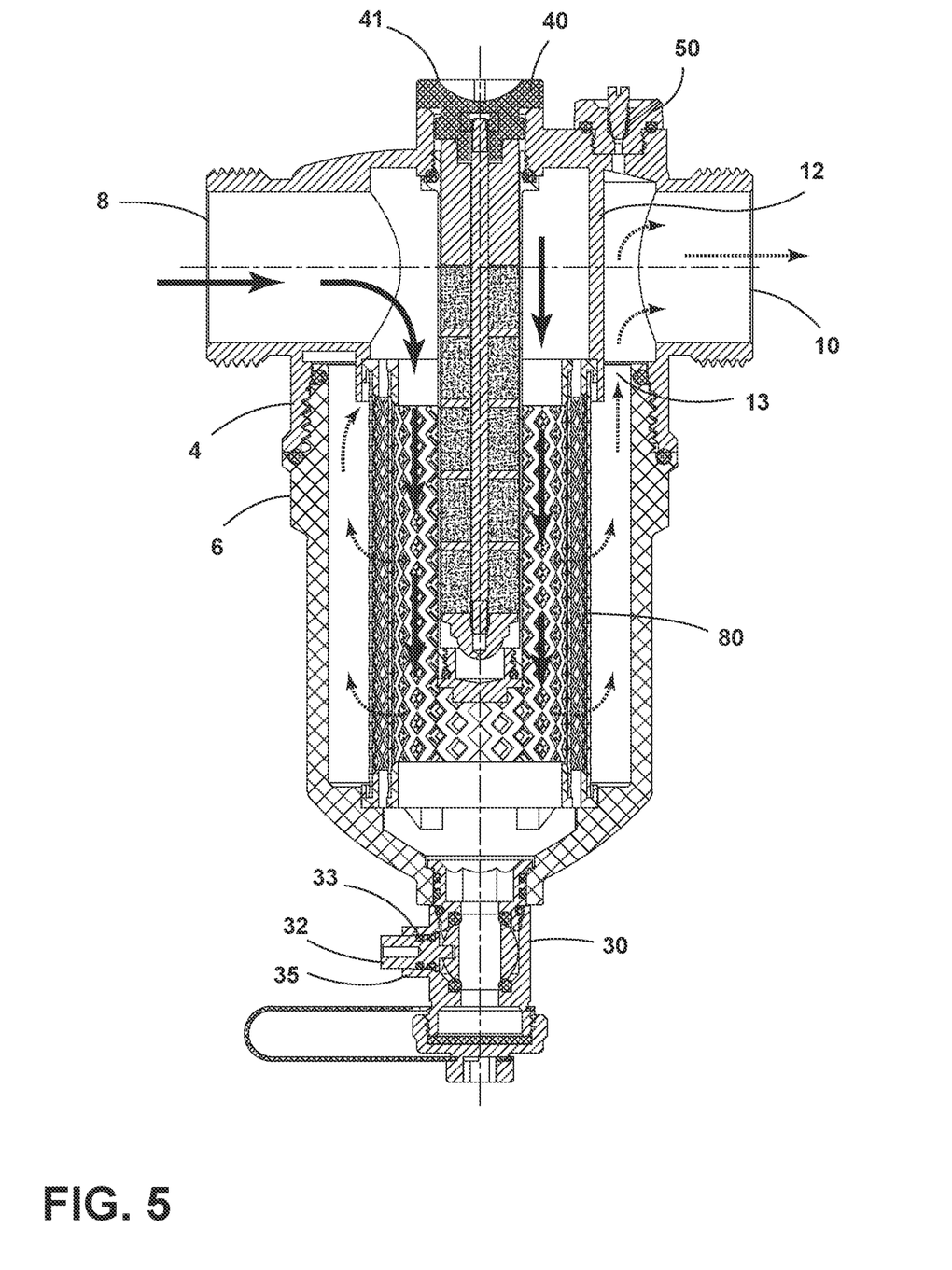
FIG. 5 is a cross-sectional view of the magnetic boiler filter assembly shown in FIG. 1 illustrating the flow path of the fluid.

FIG. 5 illustrates the pathway of fluid, such as water, as it enters into the magnetic water filter assembly 2. The water entering the magnetic water filter assembly 2 must pass by the magnet member 40 and must also pass through the filter 80 before exiting the gap 13 that is in between the flow diversion member 12 and the lower section 6, as illustrated in FIG. 5. The filtered fluid can then exit the second port 10. Thus, the incoming fluid is screened by screen filter 80 and passes by the magnet member 40, thereby removing any ferrous material from the fluid as it attaches to the magnet member 40 and any material screened by the filter 80. The material screened by filter 80 can collect at the bottom of the lower section 6. The collected debris can be removed by opening drain valve member 30 and removing the cap 34.

The incoming water supply tubing that couples to first port 8 can be any type of pipe or tubing, including, but not limited to, copper, PEX, etc. Similarly, the outgoing water supply can be any type of pipe or tubing, including, but not limited to, copper, PEX, etc. The positioning of the magnetic water filter assembly 2 adjacent to a boiler permits the ferrous material and nonferrous material above a certain screen size to be removed from the fluid supply before it enters the boiler, thereby increasing the efficiency and life span of the boiler.

The tool 100 can include a section 102 that corresponds in shape to the exterior section 110 of the lower section 6 to permit the rotation of the lower section 6, with respect to the upper section 4, utilizing tool 100. In addition, the tool 100 can include a curved surface 106 and an opening 108 that can be used to remove the magnet member 40 and/or clean debris off the magnet member 40.

The vent valve 50 acts as an air vent to release trapped air. The vent valve 50 is positioned above the gap 13, as illustrated in FIG. 4.

The ports 8 and 10 can include a variety of fittings such as male iron pipe, female iron pipe, sweat, press fit, push-to-connect, PEX, fusion, or other types of fittings. The fittings could also be part of a separate union that is connected to the port. The fittings on each port could be the same or different depending upon the connection, type, and size of the piping/tubing.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the afore-mentioned structures and methods without departing from the concepts of the present invention, and further it is to be understood that such concepts are intended to be covered by the following claims unless these claims by their language expressly state otherwise.

The invention is claimed as follows:

1. A magnetic water filter assembly, comprising:
a housing having an upper section and a lower section wherein:
said upper section has a first port and an oppositely disposed second port with a flow diversion member positioned adjacent to said second port;
said upper section including a magnet opening that is positioned on a top surface of said upper section in between said first port and said second port, said magnet opening being generally perpendicular to a centerline of the first port and the second port;
said lower section having an open cavity;
said lower section is removably coupled to said upper section;
said lower section having a drain port;
a screen member positioned in said open cavity of said lower section, said screen member including a cavity section that is in fluid communication with said first port;
a magnet member coupled to said magnet opening, said magnet member including a magnetic element positioned in a part of a fluid passageway that is defined by said centerline of said first port and said second port between said first port and said second port, said magnet member extending into said cavity section of said screen member with a portion of said magnet member surrounded by a magnet cover;

wherein water entering said first port flows past said magnet member, through said screen member, past a gap between said flow diversion member and said second port, and then out said second port; and a drain valve member with a rotatable ball coupled to said drain port.

2. The magnetic water filter assembly of claim 1, including a vent valve coupled to a vent valve opening in said upper section, adjacent to said second port.

3. The magnetic water filter assembly of claim 1, including a separate drain extension coupled to said drain port.

4. The magnetic water filter assembly of claim 3, wherein said drain valve member is coupled to said drain extension.

5. The magnetic water filter assembly of claim 1, wherein said upper section is metal.

6. The magnetic water filter assembly of claim 5, wherein said lower section is made from a glass-filled polymer.

7. The magnetic water filter assembly of claim 1, wherein said lower section includes two O-ring grooves adjacent to a threaded surface on said lower section that couples to a threaded surface on said upper section, with one O-ring groove being positioned below the threaded surface of the lower section and the other O-ring groove positioned above the threaded surface on the lower section.

8. The magnetic water filter assembly of claim 7, including O-rings positioned in said two O-ring grooves.

9. A plumbing system with a magnetic water filter assembly, comprising:
a housing having an upper section and a lower section wherein:
said upper section has a first port and an oppositely disposed second port with a flow diversion member positioned adjacent to said second port;
said upper section including a magnet opening that is positioned on a top surface of said upper section in between said first port and said second port, said magnet opening being generally perpendicular to a centerline of the first port and the second port;
said lower section having an open cavity;
said lower section having a drain port;
said lower section is removably coupled to said upper section;
a screen member positioned in said open cavity of said lower section, said screen member including a cavity section that is in fluid communication with said first port;
a magnet member coupled to said magnet opening, said magnet member including a magnetic element positioned in a part of a fluid passageway that is defined by said centerline of said first port and said second port between said first port and said second port, said magnet member extending into said cavity section of said screen member;
wherein water entering said first port flows past said magnet member, through said screen member, past a gap between said flow diversion member and said second port, and then out said second port;
a drain valve member with a rotatable ball coupled to said drain port;
an incoming water supply pipe coupled to said first port; and
an outgoing water supply pipe coupled to said second port.

10. The plumbing system of claim 9, including a vent valve coupled to a vent valve opening in said upper section, adjacent to said second port.

11. The plumbing system of claim 9, including a separate drain extension coupled to said drain port.

12. The plumbing system of claim 11, wherein said drain valve member is coupled to said drain extension.

13. The plumbing system of claim 9, wherein said upper section is metal and said incoming and outgoing water supply pipes are metal.

14. The plumbing system of claim 13, wherein said lower section is made from a glass-filled polymer.

15. The plumbing system of claim 9, wherein said lower section includes two O-ring grooves adjacent to a threaded surface that couples to a threaded surface on said upper section, with one O-ring groove being positioned below the threaded surface and the other O-ring groove positioned above the threaded surface.

16. The plumbing system of claim 15, including O-rings positioned in said two O-ring grooves.

17. A plumbing system for a boiler, comprising:
a housing having an upper section and a lower section wherein:
said upper section has a first port and an oppositely disposed second port with a flow diversion member positioned adjacent to said second port;
said upper section including a magnet opening that is positioned on a top surface of said upper section in between said first port and said second port, said magnet opening being generally perpendicular to a centerline of the first port and the second port;
said lower section having an open cavity;
said lower section is removably coupled to said upper section;
said lower section having a drain port;
a screen member positioned in said open cavity of said lower section, said screen member including a cavity section that is in fluid communication with said first port;
a magnet member coupled to said magnet opening including a magnetic element positioned in a part of a fluid passageway that is defined by said centerline of said first port and said second port between said first port and said second port, said magnet member extending into said cavity section of said screen member;
wherein water entering said first port flows past said magnet member, through said screen member, past a gap between said flow diversion member and said second port, and then out said second port;
a drain valve member with a rotatable ball coupled to said drain port;
an incoming water supply coupled to said first port; and
an outgoing water supply coupled between said second port for use with said boiler.

18. The plumbing system of claim 17, including a vent valve coupled to a vent valve opening in said upper section, adjacent to said second port.

19. The plumbing system of claim 17, including a separate drain extension coupled to said drain port.

20. The plumbing system of claim 19, wherein said drain valve member is coupled to said drain extension.

* * * * *